United States Patent
Peng et al.

(10) Patent No.: US 7,435,075 B2
(45) Date of Patent: Oct. 14, 2008

(54) THERMOFORMING MACHINE

(75) Inventors: Jeng-Chi Peng, Tu-Cheng (TW);
Heng-Wei Li, Fremont, CA (US)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 111 days.

(21) Appl. No.: 11/483,127

(22) Filed: Jul. 7, 2006

(65) Prior Publication Data

US 2007/0087072 A1   Apr. 19, 2007

(30) Foreign Application Priority Data

Oct. 14, 2005   (CN)   ................. 2005 1 0100367

(51) Int. Cl.
*B28B 3/00*   (2006.01)
(52) U.S. Cl. .................. 425/394; 425/398; 425/395
(58) Field of Classification Search ................. 425/112, 425/127, 394, 398, 407, 395
See application file for complete search history.

(56) References Cited

U.S. PATENT DOCUMENTS 4,533,555 A * 8/1985 Harris ...................... 425/384
5,814,185 A * 9/1998 Chun et al. ................. 156/580
6,314,873 B1 * 11/2001 Lee et al. ...................... 100/35
7,293,976 B2 * 11/2007 La Sorda ..................... 425/340

FOREIGN PATENT DOCUMENTS

CN   2061891 U   9/1990

* cited by examiner

*Primary Examiner*—Yogendra Gupta
*Assistant Examiner*—Maria Veronica D Ewald
(74) *Attorney, Agent, or Firm*—Morris Manning Martin LLP; Tim Tingkang Xia, Esq.

(57) ABSTRACT

A thermoforming machine includes an upper frame (10) and a lower frame (40). The upper frame includes a top bracket (20) and a bottom bracket (30). The top bracket has a driving mechanism and a screw post (272) therein. The bottom bracket has an upper base plate (32) and a lower base plate (36) disposed with a distance therebetween. The upper base plate has a top forming plate (324) thereon. The lower base plate has a lower forming plate (362) thereon corresponding to the upper mold plate. One end of the screw post is fixed to the upper base plate, and the other end of the screw post is connected with the driving mechanism. The driving mechanism is for driving the screw post to bring the upper base plate moving toward or away the lower base plate.

14 Claims, 4 Drawing Sheets

THERMOFORMING MACHINE

BACKGROUND OF THE INVENTION

1. Field of the Invention

The present invention relates to thermoforming machines, and particularly to a thermoforming machine which can be installed with various molds for forming a flat film onto a shaped mold.

2. Discussion of the Related Art

A traditional technology to decorate the plastic components is using post-molding techniques, including airbrushing, pad printing, painting, etc. However, these decorating methods are time-consuming, and the resulting appearance is poor. Therefore, in mold decoration (IMD) has been developed to decorate plastic components. A first decorating film is placed in a mold cavity in which the product is to be formed. A molten material is then injected into the mold cavity. The decorative film is attached to the surface of the molded product after a mold cavity containing the decorative film is injection molded. Thus, the decorative film needs to be accurately placed into position so that the decoration thereof is aligned with the intended location on the product. The product is then molded in contact with the decorative film. After cooling, the product with the decorative film is removed from the mold, thereby completing the fabrication of the product.

However, the IMD process has a number of drawbacks. Firstly, IMD film cannot be preformed, and hence it is limited to flat or only slightly shaped products. Secondly, IMD product design geometry is limited. When either side of a core or a cavity insert is higher than the parting line, the film will squeezed and IMD can not be applied. Thirdly, IMD film has a release carrier which needs to be removed.

In mold labeling (IML) is an improved technique for decorating a plastic parts. It starts with a high precision printed plastic film that goes through a pre-forming process to form a three-dimensional (3D) film. The 3D film is then trimmed of its excess material to match a molded product. Then, the 3D film is placed in a mold cavity of a mold machine, and fuse together with the molten material injected into the cavity. The most critical part of IML is in the thermoforming or pre-forming process of the decorating film. Conventional thermoforming process for flat films includes vacuum forming, pressure forming, hydro forming, and matched metal forming. The cheapest of these methods is matched metal forming. Matched metal forming generally uses gas or pressurized hydraulic fluid as a driving force. However, it is a difficult to precisely control process which can result in deformation of the pre-forming film because of speed at which the film is stretched.

What is needed, therefore, is a thermoforming machine which overcomes these problems.

SUMMARY OF THE INVENTION

A thermoforming machine includes an upper frame and a lower frame. The upper frame includes a top bracket and a bottom bracket. The top bracket has a driving mechanism and a screw post therein. The bottom bracket has an upper base plate and a lower base plate separated by a distance therefrom. The upper base plate has a top forming plate thereon. The lower base plate has a lower forming plate thereon corresponding to the upper mold plate. One end of the screw post is fixed to the upper base plate, and the other end of the screw post is connected with the driving mechanism. The driving mechanism is for driving the screw post to move the upper base plate towards or away from the lower base plate.

Other advantages and novel features will become more apparent from the following detailed description when taken in conjunction with the accompanying drawings.

BRIEF DESCRIPTION OF THE DRAWINGS

Many aspects of the thermoforming machine can be better understood with reference to the following drawings. The components in the drawings are not necessarily drawn to scale, the emphasis instead being placed upon clearly illustrating the principles of the present thermoforming machine. Moreover, in the drawings, like reference numerals designate corresponding parts throughout the several views.

DETAILED DESCRIPTION OF PREFERRED EMBODIMENTS

Figure 1:
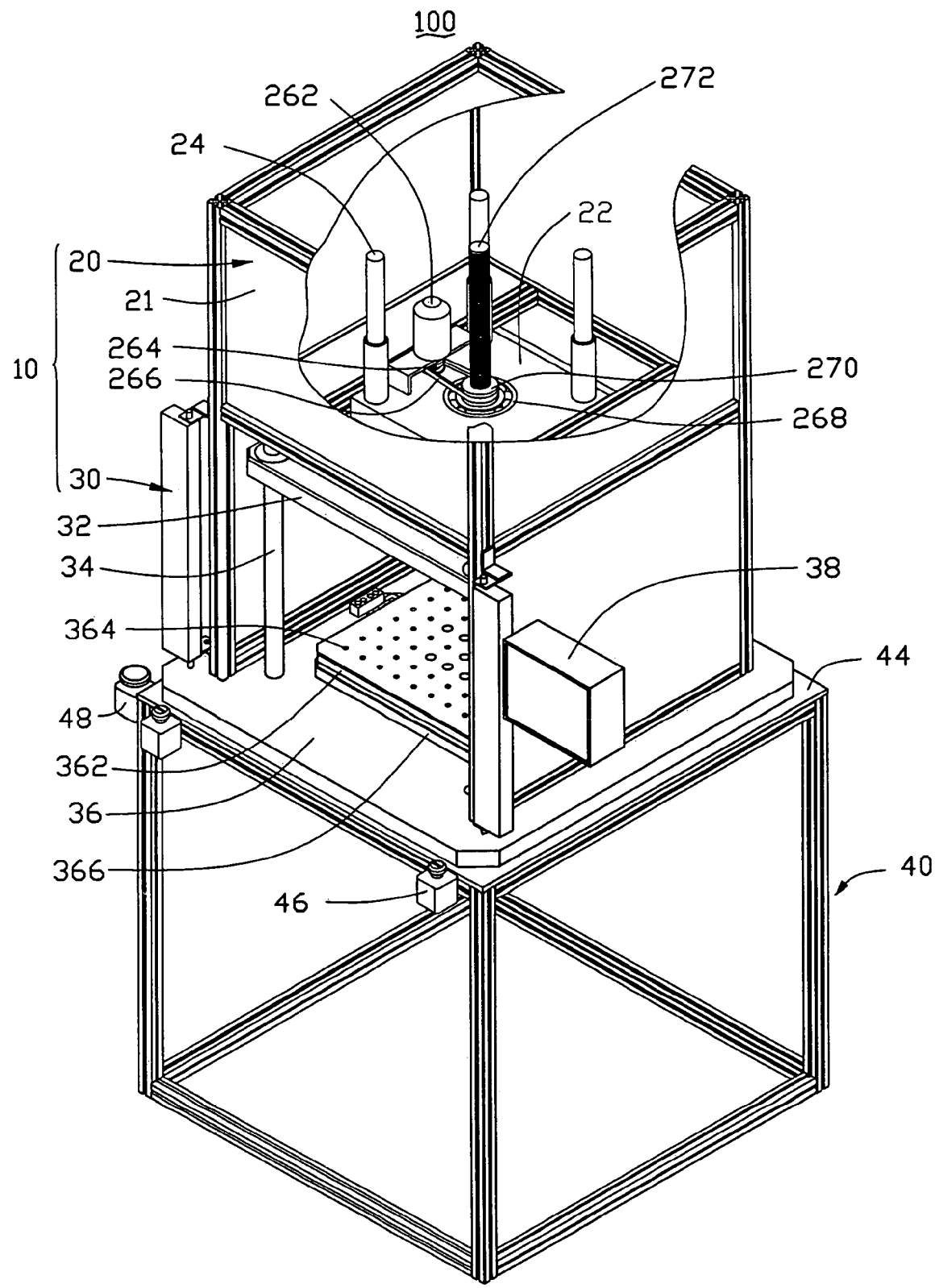
FIG. 1 is an isometric view of a thermoforming machine, in accordance with one preferred embodiment.

Referring now to the drawings, FIG. 1 shows a thermoforming machine 100 according to a preferred embodiment. The thermoforming machine 100 is adapted for pre-forming all kinds of flat film into a 3D film. The thermoforming machine 100 includes an upper frame 10 and a lower frame 40. The upper frame 10 and the lower frame 40 are made of Metal-Alumina-Silicon (MAS). A distance between a top of the upper frame 10 and a bottom of the lower frame 40 is 2300 millimeters.

The upper frame 10 is cuboid shaped. The upper frame 10 includes a top bracket 20 and a bottom bracket 30. The top and bottom brackets 20, 30 are connected with each other via a square bracket (not labelled) therebetween. The top bracket 20 has a plate-like support member 22, four stand posts 24, and a driving mechanism (not labelled), all of which are disposed therein. In use, a top and three sides of the top bracket 20 are closed by close plate 21, and one side is open for facilitating operation. The driving mechanism includes a servo motor 262, a flywheel 264, a belt 266, a roller bearing 268, and a nut 270. The bottom bracket 30 has an upper plate-like base member 32, four guide posts 34, and a lower plate-like base member 36.

The support plate 22 is used to support the driving mechanism. The support plate 22 is cuboid shaped, and has four holes (not labelled). The four stand posts 24 movably pass through their respective holes of the support plate 22. One end of each stand post 24 connects to the upper base plate 32 in the bottom bracket 30. The support plate 22 has an opening (not labelled) defined in a central portion thereof for receiving the roller bearing 268.

The flywheel 264 is located beneath the servo motor 262, and is driven by the servo motor 262. One end of the belt 266 winds around the flywheel 264, and the other end of the belt 266 winds around the nut 270. The roller bearing 268 is located beneath the nut 270 to reduce friction. The servo motor 262, the flywheel 264, the roller bearing 268, and the nut 270 are supported by the support plate 22. The nut 270 threadingly engages with a connecting post like a screw post 272. One end of the screw post 272 is securely connected with the upper base plate 32. The servo motor 262 drives the nut 270 to rotate via the belt 266. The screw post 272 moves up and down under the thread-engagement between the nut 270 and the screw post 272, which brings out the movement of the upper base plate 32.

Figure 2:
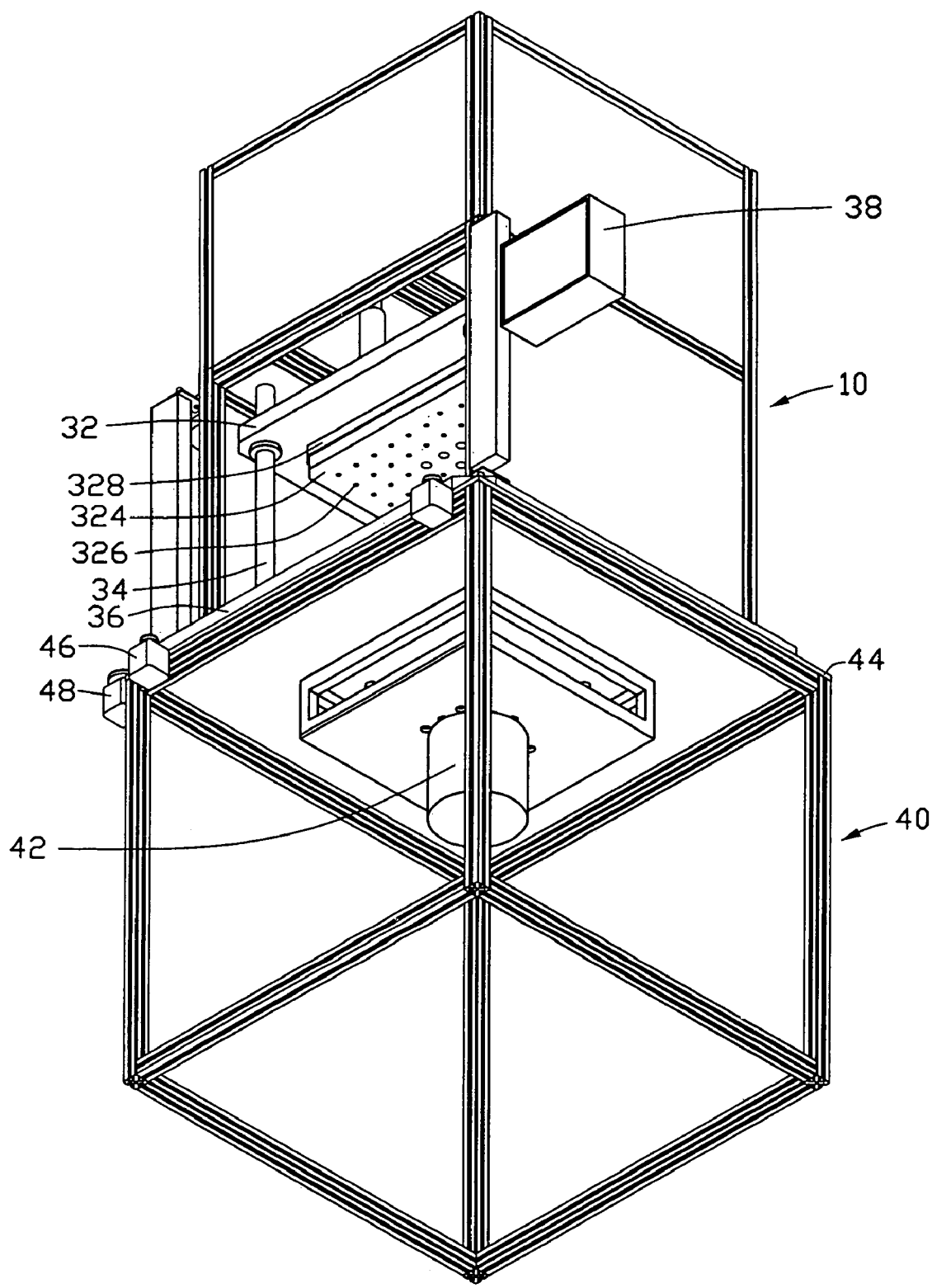
FIG. 2 is similar to FIG. 1, but showing another aspect.
Figure 3:
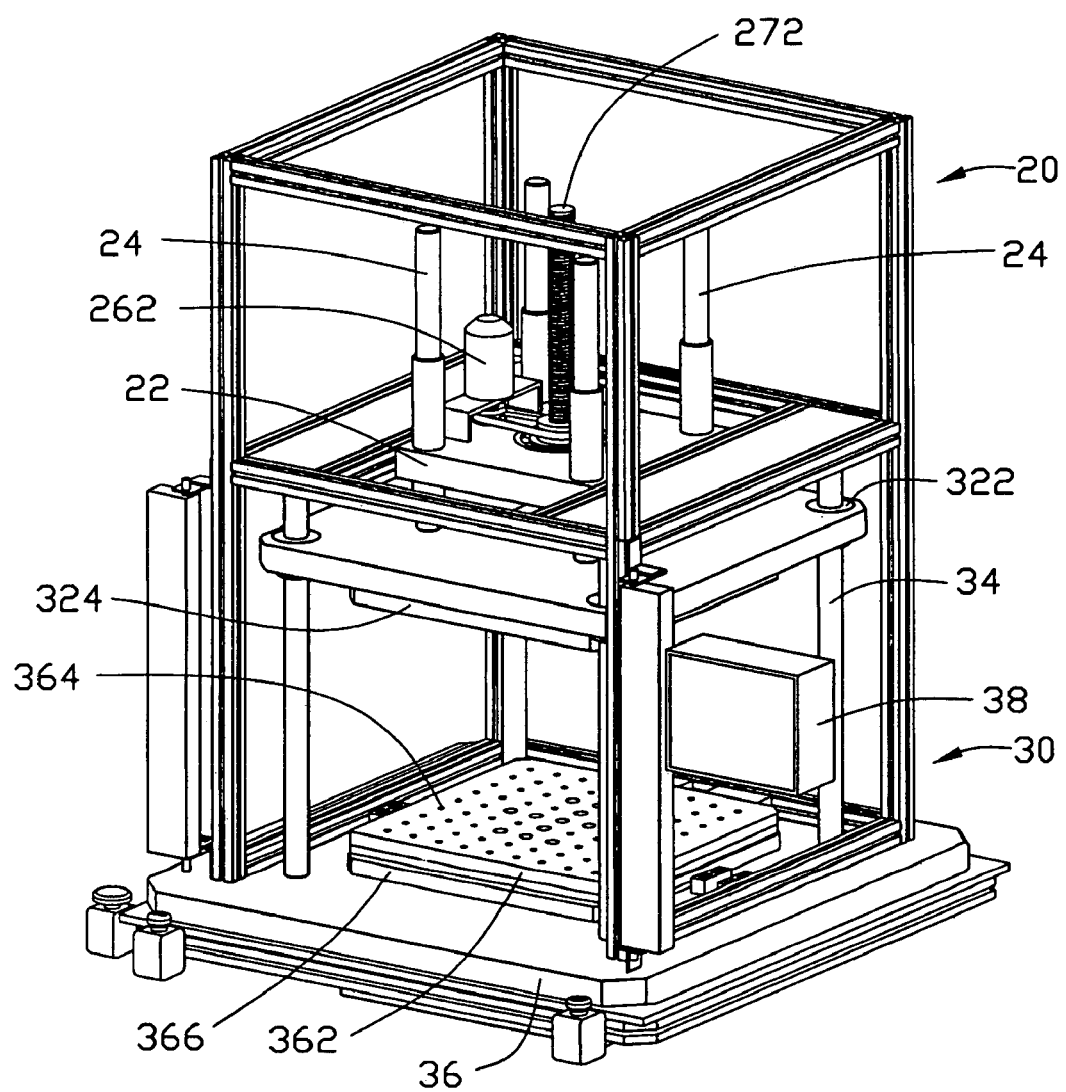
FIG. 3 is an isometric view of a top frame of the thermoforming machine of FIG. 1.

Referring to FIGS. 2 and 3, the upper base plate 32 is cuboid shaped and a top forming plate is mounted under the upper base plate 32. The upper base plate 32 has four holes 322 defined in four corners thereof. The top forming plate 324 has a plurality of fixation holes 326 for securing all kinds of male molds according to different requirements. An insulator plate 328 is disposed between the upper base plate 32 and the top forming plate 324 to prevent heat from damaging other parts of the machine.

One end of each guide post 34 is secured to the lower base plate 36, and the other end of each guide post 34 movably passes through a respective hole 322 of the upper base plate 32, whereby the upper base plate 32 can move up and down along the guide post 34.

The lower base plate 36 is cuboid shaped. A bottom forming plate 362 is mounted above the lower base plate 36. The bottom forming plate 362 has a plurality of fixation holes 364 for securing all kinds of female molds according to different requirements. An insulator plate 366 is disposed between the lower base plate 36 and the bottom forming plate 362 to prevent the heat from damaging the other parts of the machine.

A human/machine interface 38 is disposed one side of the bottom bracket 30 for inputting control instructions. Speed and distance of movement of the top forming plate 324 can be manually adjusted via the human/machine interface 38. Temperature and any movement holding time can be manually adjusted. A system trouble shooting and progress indicator display can be shown in the human/machine interface 38.

Referring again to FIG. 2, the bottom frame 40 is square. A length of each side is 1000 millimeters. A distance between bottom end of the bottom frame 40 and the bottom forming plate 362 is 1000 millimeters. The bottom frame 40 is disposed beneath the top frame 10 to support the top frame 10. The bottom frame 40 has an air blower system 42 and heating system disposed therein. The air blower system 42 blows cold air onto a mold fixed on the bottom forming plate 362. An upper plate 4 is disposed on a top of the bottom frame 40. The lower base plate 36 is disposed on the bottom plate 44. A start button 46 is disposed on each of the two sides of the bottom frame 40. A stop button 48 is disposed adjacent to one of the start buttons 46. In use, the bottom bracket 40 is sealed by close plates.

In use, firstly, a proper mold including a female mold part and a male mold part is provided according to the pre-formed film shape. The male mold part and the female mold part are respectively secured on the top forming plate 324 and the bottom forming plate 362. The male mold generally includes a cushion plate, a male core, and a press plate. The male mold is secured on the top forming plate 324 via the cushion plate. Firstly, the power is on, and the male mold part and the female mod part of the mold are pre-heated up to 400 Fahrenheit. Secondly, a flat film is positioned on the female mold, and then the start button 46 is turned on. The servo motor 262 is turned on and starts working. The servo motor 262 drives the fly wheel 264 to rotate. The fly wheel 264 drives the nut 272 to rotate via the belt 266. The screw post 272 moves downwardly under screw-engagement between the nut 270 and the screw post 272. Because the screw post 272 is securely connected with the upper base plate 32, the upper base plate 32 moves downwardly, which makes the top forming plate 322 move downwardly. The press plate firstly contacts the flat film. The top forming plate 324 then continues to move downwardly. When the press plate compresses the flat film firmly, the heating system starts to heat the flat film to about 204 centigrade. The upper base plate 32 continues to move downwardly. When the male core contacts the flat film, the flat film is heated by heated air to about 204 centigrade over about 5 minutes. The heating time can be adjusted via the human/machine interface 38. The top forming plate 324 alternates between periods of movement and motionlessness. When the mold core has gone down to its maximum pre set distance, a side slide activates. Activation time can be set manually. The air blower system blows air toward the core to prevent film from sticking to the core. The pre-formed film is pushed out after the core is raised.

A main advantage is that the upper base plate 32 can be precisely controlled because of the offset arrangement of the stand posts 24 and the guide posts 34 to guide movement of the upper base plate 32, and a fine engagement between the screw post 272 and the nut 270 of the driving mechanism.

Figure 4:
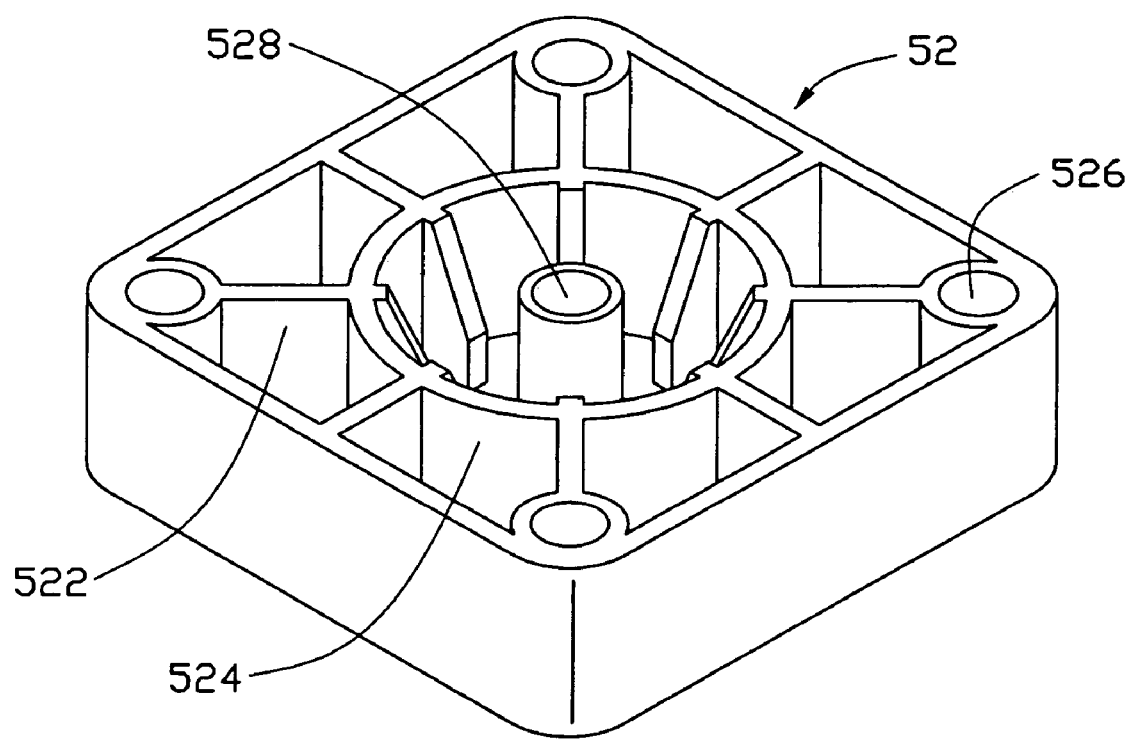
FIG. 4 is an isometric view of an upper base plate of a thermoforming machine, in accordance with another preferred embodiment.

Referring to FIG. 4, an upper base plate 52 of a thermoforming machine according to another embodiment is illustrated. The upper base plate 52 is in the shape of a frame and cuboid shaped. The upper base plate 52 has a barrel portion 524 formed in the middle thereof, and eight connecting plates 522 extending from a peripheral wall of the barrel portion 524 to the inner peripheral wall and the four corners of the base plate 52. The upper base plate 52 has four through holes 526 respectively defined through four corners thereof such that the guide posts 34 pass through the through holes 526 and the upper base plate 52 can move up and down relative to the guide posts 34. A hollow cylinder 528 extends from a bottom of the upper base plate 52. The screw post 272 is securely received in the cylinder 528. The upper base plate 52 is cast in such a way that the upper base plate 52 has low weight, high strength and difficult to deform.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thermoforming machine, comprising:
an upper frame, including:
a top bracket having a driving mechanism and a screw post therein, the driving mechanism threadingly engaging with the screw post; and
a bottom bracket having an upper base plate and a lower base plate disposed therein with a gap defined therebetween, one end of the screw post fixed to the upper base plate so that the driving mechanism is capable of driving the screw post to move the upper base plate toward or away from the lower base plate, the upper base plate having a top forming plate disposed at a bottom thereof, the lower base plate having a bottom forming plate disposed at a top thereof, the upper base plate having a barrel portion formed in the middle thereof, and a plurality connecting plates extending from peripheral wall of barrel portion to the inner peripheral wall and the four corners of the base plate; and
a lower frame supporting the upper frame.

2. The thermoforming machine as claimed in claim 1, wherein the driving mechanism includes a servo motor, a flywheel, a belt, a roller bearing, and a nut, the flywheel is located beneath the servo motor and is driven by the servo motor, one end of the belt winds around the flywheel, and the other end of the belt winds around the nut.

3. The thermoforming machine as claimed in claim 2, further comprising a support plate defining an opening in a central portion thereof, the roller bearing secured in the opening, the nut being disposed above and supported by the roller bearing.

4. The thermoforming machine as claimed in claim 3, wherein the screw post passes through the nut, the roller bearing and the opening of the support plate, and the screw post engages with the nut.

5. The thermoforming machine as claimed in claim 4, farther comprising four stand posts symmetrically disposed, one end of each stand post connected to the top of the upper base plate.

6. The thermoforming machine as claimed in claim 5, wherein the support plate has four holes defined in four corners thereof, and each stand post passes through a respective hole.

7. The thermoforming machine as claimed in claim 1, wherein the upper base plate has at least one hole defined in an adjacent peripheral wall, the bottom bracket further comprises at least one guide post, and one end of each of the at least one guide post is secured to the lower base plate, and the other end of the at least one guide post extends through the corresponding hole of the upper base plate.

8. The thermoforming machine as claimed in claim 7, the at least one hole of the upper base plate comprises four holes, and the at least one guide post comprises four guide posts.

9. The thermoforming machine as claimed in claim 1, wherein the upper base plate is in the shape of a frame, and formed by means of casting.

10. The thermoforming machine as claimed in claim 9, wherein the upper base plate is cuboid shaped.

11. The thermoforming machine as claimed in claim 1, wherein the bottom bracket has a heating system and an air blower system.

12. A thermoforming machine comprising:
an upper frame, including:
a top portion having a first group of posts;
a bottom portion having a first base member, a second base member, and a second group of posts, the first base member configured for positioning a first mold part of a mold thereon, the second base member spaced from said first base member and configured for positioning a second mold part of said mold thereon to face said first mold part and said second mold part matable with said first mold part to pre-form a decorating film placed therebetween, the first group of posts extending between said first base member and a support member to supportively maintain spacing of said first base member and said support member and allow movement of said first base member relative to said support member, and the second group of posts extending between said first base member and said second base member to supportively maintain spacing of said first base member and said second base member and allow another movement of said first base member relative to said second base member, each post of said second group of posts extending offset from every post of said first group of posts;
said support member spaced from said first base member at a side of said first base member opposite to said second base member;
a connecting post extendably attachable to said first base member from said support member to move said first base member relative to said support member and said second base member, and a distance between said each post of said second group of posts and said connecting post being larger than a distance between said each post of said first group of posts and said connecting post; and
a lower frame supporting the upper frame.

13. The thermoforming machine as claimed in claim 12, further comprising a driving mechanism disposed about said support member to drive said connecting post to move said first base member relative to said second base member and said support member.

14. A thermoforming machine, comprising:
an upper frame, including:
a top bracket having a driving mechanism and a screw post therein, the driving mechanism threadingly engaging with the screw post; and
a bottom bracket having an upper base plate and a lower base plate disposed therein with a gap defined therebetween, one end of the screw post fixed to the upper base plate so that the driving mechanism is capable of driving the screw post to move the upper base plate toward or away from the lower base plate, the upper base plate having a top forming plate disposed at a bottom thereof, the lower base plate having a bottom forming plate disposed at a top thereof, the upper base plate comprising four holes defined in an adjacent peripheral wall, and four guide posts disposed in the bottom bracket, one end of each guide post secured to the lower base plate, and the other end of the each guide post extending through the corresponding hole of the upper base plate; and
a lower frame supporting the upper frame.

\* \* \* \* \*